United States Patent
Sun (10) Patent No.: US 10,143,072 B2
(45) Date of Patent: Nov. 27, 2018

(54) MULTI-CHANNEL DUAL-MODE DIGITAL CONTROL LED DRIVING CIRCUIT AND LED LAMP

(71) Applicants: SHENZHEN SKYWORTH-RGB ELECTRONIC CO., LTD., Shenzhen (CN); SHENZHEN SKYWORTH SEMICONDUCTOR DESIGN CENTER CO., LTD., Shenzhen (CN)

(72) Inventor: Tianqi Sun, Shenzhen (CN)

(73) Assignees: SHENZHEN SKYWORTH-RGB ELECTRONIC CO., LTD, Shenzhen (CN); SHENZHEN SKYWORTH SEMICONDUCTOR DESIGN CENTER CO., LTD., Shenzhen (CN)

( * ) Notice: Subject to any disclaimer, the term of this patent is extended or adjusted under 35 U.S.C. 154(b) by 5 days.

(21) Appl. No.: 15/507,385

(22) PCT Filed: Feb. 1, 2016

(86) PCT No.: PCT/CN2016/073082
§ 371 (c)(1),
(2) Date: Feb. 28, 2017

(87) PCT Pub. No.: WO2016/184169
PCT Pub. Date: Nov. 24, 2016

(65) Prior Publication Data
US 2017/0295632 A1  Oct. 12, 2017

(30) Foreign Application Priority Data
May 19, 2015 (CN) .................. 2015 1 02552612

(51) Int. Cl.
*H04B 7/26* (2006.01)
*H05B 41/392* (2006.01)
(Continued)

(52) U.S. Cl.
CPC ......... *H05B 41/392* (2013.01); *H04B 7/2643* (2013.01); *H04B 7/2656* (2013.01);
(Continued)

(58) Field of Classification Search
CPC .... H04B 7/2643; H04B 7/2656; H04B 14/02; H04B 14/026; H05B 37/02; H05B 41/28;
(Continued)

(56) References Cited

U.S. PATENT DOCUMENTS 6,989,701 B2 * 1/2006 Lin ..................... H04B 10/502
327/109
8,552,942 B2 * 10/2013 Hua ................... H05B 33/0815
345/77
(Continued)

FOREIGN PATENT DOCUMENTS

CN  101340760 A  1/2009
CN  201928475 U  8/2011
(Continued)

OTHER PUBLICATIONS

The World Intellectual Property Organization (WIPO) International Search Report for PCT/CN2016/073082 dated Apr. 28, 2016 6 Pages.

*Primary Examiner* — Frank Duong
(74) *Attorney, Agent, or Firm* — Anova Law Group PLLC (57) ABSTRACT

A multi-channel dual-mode digital control LED driving circuit and an LED lamp. The driving circuit comprises a current sampling module (10), a comparison and detection module (30), a digital control module (40) and a constant current control module (20). By means of feeding back an adjustment current for the load (70) by the digital control module (40), and feeding back and adjusting a current of the load (70) in real time by the constant current control module (Continued)

(20), the driving circuit adjusts the load (70) in real time, so that dual-mode cooperation working is realized, and thus a response speed is greatly improved, the accuracy of an output voltage and the current of the load (70) is improved, and at the same time, the system stability is enhanced and wide universality is achieved.

18 Claims, 4 Drawing Sheets

(51) Int. Cl.
 *H05B 37/02* (2006.01)
 *H05B 41/28* (2006.01)
 *H05B 41/282* (2006.01)
(52) U.S. Cl.
 CPC ............. *H05B 37/02* (2013.01); *H05B 41/28* (2013.01); *H05B 41/282* (2013.01); *H05B 41/3927* (2013.01); *Y02B 20/42* (2013.01)
(58) Field of Classification Search
 CPC ................ H05B 41/282; H05B 41/392; H05B 41/3927; H04L 1/0003; H04L 1/0009; H04L 5/0007; H04L 5/12; H04L 25/4902; H04J 3/04; H04J 3/1676; Y02B 20/42
 See application file for complete search history.

(56) References Cited

U.S. PATENT DOCUMENTS

| 9,699,844 B2* | 7/2017 | Xu ..................... H05B 33/0815 |
| 2005/0202851 A1* | 9/2005 | Yamamoto ......... H05B 33/0818 |
| | | 455/566 |
| 2012/0074857 A1* | 3/2012 | Cheng ................ H05B 33/0812 |
| | | 315/201 |
| 2013/0249421 A1* | 9/2013 | Cavallini ........... H05B 33/0842 |
| | | 315/193 |
| 2017/0019967 A1* | 1/2017 | Tischler ............. H05B 33/0815 |

FOREIGN PATENT DOCUMENTS

| CN | 103037597 A | 4/2013 |
| CN | 203984727 U | 12/2014 |
| CN | 104883780 A | 9/2015 |
| JP | 2003264316 A | 9/2003 |

* cited by examiner

MULTI-CHANNEL DUAL-MODE DIGITAL CONTROL LED DRIVING CIRCUIT AND LED LAMP

CROSS-REFERENCES TO RELATED APPLICATIONS

This application is a national stage application of PCT Patent Application No. PCT/CN2016/073082, filed on Feb. 1, 2016, which claims priority to Chinese Patent Application No. 201510255261.2, filed on May 19, 2015, the content of all of which is incorporated herein by reference.

FIELD OF THE INVENTION

The present invention relates to the field of LED technology, and, more particularly, to a multi-channel dual-mode digital control LED driving circuit and an LED lamp.

BACKGROUND

In modern society, energy and environment protection have become a main problem faced by people. An LED has achieved a daily increased attention in a lighting field, due to a plurality of advantages thereof, including: a high efficiency, a low energy consumption, an environment protection, a small volume, a long lifespan, and more. However, limited by a character of optical and electrical, the LED requires a special constant current driving circuit as a supplement before being able to work properly, so an importance of an LED driving system is self-evident.

In an integrated circuit system, the existing LED driving systems are mainly adopting a work method of a single mode control, generally, a voltage mode or a peak current mode is adopted to work, usually, it includes three parts: current sampling-feeding back-circuit control. Wherein, for the part of circuit control, usually it is an analog method, that is, a process of controlling a change of a duty circle through comparing a sampling signal and a fixed voltage, and further controlling a change of an output voltage. A plurality of main defects of such an invention is as follows: first, the work mode is single, a system stability is general, a response speed is slow due to it is required to experience a whole system adjustment process from the current sampling to feedback control; second, the part of circuit control is mainly a simple comparison process, with a relatively low accuracy, causing a range of the output voltage after feeding back too large, additionally, subjecting to an effect of a plurality of environment factors including a process deviation, a temperature, a humidity and more, it may also cause the accuracy of the control part decrease; third, a generality of the system is relatively poor, usually, a driving system is mainly specialized, in a real implementation, a plurality of applications including changing a condition, increasing or decreasing a function, is hard to be achieved.

Therefore, the current technology needs to be improved and developed.

BRIEF SUMMARY OF THE DISCLOSURE

According to the above described defects in the prior art, the purpose of the present invention is providing a multi-channel dual-mode digital control LED driving circuit and an LED lamp, by means of feeding back an adjustment voltage for a load by a digital control module, and feeding back an adjustment current for the load by a constant current control module, so that a dual-mode cooperation working way is realized, achieving a wide universality.

In order to achieve the above mentioned goals, the technical solution of the present invention to solve the technical problems is as follows:

A multi-channel dual-mode digital control LED driving circuit, wherein, it comprises: a current sampling module, a comparison and detection module, a digital control module and a constant current control module;

the current sampling module converts a current signal of a load into a sampling voltage signal, before outputting to the comparison and detection module and the constant current control module; the comparison and detection module compares the sampling voltage to a fixed voltage, before generating a high/low voltage signal according to a comparison result, and outputting to the digital control module, while at a same time, a dynamically changing voltage signal is generated and output to the constant current control module; the digital control module outputs a corresponding step-up or step-down output signal to an external voltage boost control module and a drive module sequentially, according to the high/low voltage signal output from the comparison and detection module, thus a feedback adjustment to the load is achieved; the constant current control module compares to a fixed frequency sawtooth signal according to the sampling voltage, and generates a switching signal with a changing duty cycle in a real time, before controlling a switch state of an inner constant current drive tube according to the duty cycle change of the switching signal, feeding back an adjustment current for the load in a real time.

The multi-channel dual-mode digital control LED driving circuit, wherein, the comparison and detection module comprises:

a detection unit, applied to comparing and amplifying the sampling voltage with the fixed voltage, before outputting an amplifying signal to a comparison unit, the larger a ratio between the fixed voltage and the sampling voltage is, the higher a voltage of the output amplifying signal is;

a comparison unit, applied to outputting a low voltage from a first output end and a high voltage from a second output end, when the amplifying signal output from the detection unit is larger than a first threshold voltage, and outputting a high voltage from the first output end and a low voltage from the second output end, when the amplifying signal output from the detection unit is smaller than a second threshold voltage, as well as outputting a low voltage from both the first and second output ends, when the amplifying signal output from the detection unit is larger than the second threshold voltage but smaller than the first threshold voltage;

an input end of the detection unit connects to the output end of the current sampling module, the detection unit connects to the comparison unit, while the first and second output ends of the comparison unit connect to the digital control module.

The multi-channel dual-mode digital control LED driving circuit, wherein, the digital control module comprises:

a logic unit, applied to converting the signals from both output ends of the comparison unit into an eight-bit logic control signal, when the first output end of the comparison unit is outputting the low voltage, and the second output end is outputting the high voltage, the eight-bit logic control signal rises bit by bit from low to high in a 256-bit interval; when the first output end of the comparison unit is outputting the high voltage, and the second output end is outputting the low voltage, the eight-bit logic control signal reduces bit by bit from high to low in the 256-bit interval; when the first output end and the second output end of the comparison unit are both outputting the low voltage, the eight-bit logic control signal keeps unchanged;

a voltage control unit, applied to stepping down the output voltage a stepped voltage, when the eight-bit logic control signal is raised one bit, and stepping up the output voltage a stepped voltage, when the eight-bit logic control signal is lowered one bit;

a first input end of the logic unit connects to the first output end of the comparison unit, a second input end of the logic unit connects to the second output end of the comparison unit, the logic unit connects to the external voltage boost control module through the voltage control unit.

The multi-channel dual-mode digital control LED driving circuit, wherein, the voltage control unit comprises eight current switch subunits controlled by the eight bit logic control signal, including: a first current switch subunit, a second current switch subunit, a third current switch subunit, a fourth current switch subunit, a fifth current switch subunit, a sixth current switch subunit, a seventh current switch subunit, an eighth current switch subunit, and a resistors array connected according to a binary rule, together with a mirror current subunit;

the resistors array comprises fifteen resistors strings, including: a first resistors string, a second resistors string, a third resistors string, a fourth resistors string, a fifth resistors string, a sixth resistors string, a seventh resistors string, an eighth resistors string, a ninth resistors string, a tenth resistors string, an eleventh resistors string, a twelfth resistors string, a thirteenth resistors string, a fourteenth resistors string and a fifteenth resistors string;

the current switch subunits, applied to outputting a first mirror current to the resistors array, according to a corresponding logic control signal in the eight-bit logic control signal.

the mirror current subunit, applied to outputting a second mirror current to the resistors array.

an external power supplier end connects to one end of the first resistors string and one end of the ninth resistors string, through the first current switch subunit, while another end of the first resistors string gets grounded; the external power supplier end connects to another end of the ninth resistors string, one end of the second resistors string and one end of the tenth resistors string, through the second current switch subunit, while another end of the second resistors string gets grounded; the external power supplier end connects to another end of the tenth resistors string, one end of the third resistors string and one end of the eleventh resistors string, through the third current switch subunit, while another end of the third resistors string gets grounded; the external power supplier end connects to another end of the eleventh resistors string, one end of the fourth resistors string and one end of the twelfth resistors string through the fourth current switch subunit, while another end of the fourth resistors string gets grounded; the external power supplier end connects to another end of the twelfth resistors string, one end of the fifth resistors string and one end of the thirteenth resistors string, through the fifth current switch subunit, while another end of the fifth resistors string gets grounded; the external power supplier end connects to another end of the thirteenth resistors string, one end of the sixth resistors string and one end of the fourteenth resistors string, through the sixth current switch subunit, while another end of the sixth resistors string gets grounded; the external power supplier end connects to another end of the fourteenth resistors string, one end of the seventh resistors string and one end of the fifteenth resistors string, through the seventh current switch subunit, while another end of the seventh resistors string gets grounded; the external power supplier end connects to another end of the fifteenth resistors string and one end of the eighth resistors string, through the eighth current switch subunit and the mirror current subunit, while another end of the eighth resistors string gets grounded; one end of the eighth resistors string is the output end of the voltage control unit, and connects to the external voltage boost control module.

The multi-channel dual-mode digital control LED driving circuit, wherein, the current sampling module comprises a first resistor, a second resistor, a first MOS tube and a second MOS tube; one end of the first resistor connects to the load, another end of the first resistor connects to a drain electrode of the first MOS tube, a source electrode of the first MOS tube connects to a drain electrode of the second MOS tube through the second resistor, the drain electrode of the second MOS tube is an output end of the current sampling module, a gate electrode and a source electrode of the second MOS tube get grounded.

The multi-channel dual-mode digital control LED driving circuit, wherein, the detection unit comprises a first operational amplifier, a first capacitor, a second capacitor, a third capacitor, a third resistor, a fourth resistor, a third MOS tube, a fourth MOS tube, a fifth MOS tube and a sixth MOS tube; an inverting input end of the first operational amplifier is the input end of the detection unit, and connects to the drain electrode of the second MOS tube, a non-inverting input end of the first operational amplifier connects to a fixed voltage supplier end, an output end of the first operational amplifier connects to one end of the first capacitor, a drain electrode of the third MOS tube, one end of the second capacitor and a gate electrode of the fourth MOS tube, another end of the first capacitor connects to a source electrode of the third MOS tube, a drain electrode of the fifth MOS tube, another end of the second capacitor, a source electrode of the fourth MOS tube and a drain electrode of the sixth MOS tube through the third resistor, a gate electrode of the third MOS tube connects to an enable signal, a drain electrode of the fifth MOS tube further connects to the inverse input end of the first operational amplifier, a source electrode of the fifth MOS tube connects to the non-inverse input end of the first operational amplifier, and further gets grounded through the third capacitor, a gate electrode of the fifth MOS tube connects to a PWM inverse signal supplier end; a drain electrode of the fourth MOS tube connects to an external power supplier end through a fourth resistor, a source electrode of the fourth MOS tube is the output end of the detection unit, and connects to the input end of the comparison unit and the constant current control module; a source electrode of the sixth MOS tube gets grounded.

The multi-channel dual-mode digital control LED driving circuit, wherein, the comparison unit comprises a first comparator, a second comparator, a first buffer and a second buffer; a non-inverting input end of the first comparator connects to a first threshold voltage supplier end, an inverse input end of the first comparator and a non-inverting input end of the second comparator connect to the source electrode of the fourth MOS tube, an inverse input end of the second comparator connects to a second threshold voltage supplier end; an output end of the first comparator connects to an input end of the first buffer, an output end of the first buffer is the first output end of the comparison unit, and connects to the digital control module, an output end of the second comparator connects to an input end of the second buffer, an output end of the second buffer is the second output end of the comparison unit.

The multi-channel dual-mode digital control LED driving circuit, wherein, the first current switch subunit, second current switch subunit, third current switch subunit, fourth current switch subunit, fifth current switch subunit, sixth current switch subunit, seventh current switch subunit, eighth current switch subunit are all a same; each current switch subunit comprises two PMOS tubes and one switch tube; the two PMOS tubes own a deviated current source construction of a common-source and common-gate: the source electrode of one PMOS tube connects to the external power supplier end, a drain electrode connects to a source electrode of another PMOS tube, a drain electrode of another PMOS tube connects to a source electrode of the switch tube, a gate electrode of the switch tube connects to the output end of the logic unit correspondingly, a drain electrode of the switch tube is the output end of the current switch subunit, and gets grounded through the corresponding resistors string.

The multi-channel dual-mode digital control LED driving circuit, wherein, the constant current control module comprises a third comparator and a second operational amplifier, a non-inverse input end of the third operational amplifier connects to the output end of the detection unit, and an inverse input end of the third comparator connects to an inherent low frequency sawtooth wave signal supplier end, an output end of the third comparator connects to a negative power end of the second operational amplifier, whose positive power end connects to the external power supplier end VCC; a non-inverse input end of the second operational amplifier connects to a high voltage signal supplier end, while an inverse input end of the second operational amplifier connects to an output end of the sampling module, and an output end of the second operational amplifier connects to the load.

An LED lamp, wherein, it comprises the above said multi-channel dual-mode digital control LED driving circuit.

Comparing to the prior art, the multi-channel dual-mode digital control LED driving circuit and an LED lamp provided by the present invention, by means of feeding back an adjustment voltage for the load by the digital control module, and feeding back an adjustment current for the load in real time by the constant current control module, has achieved a real time adjustment for a load variation, thus, a dual-mode cooperation working is realized, and thus a response speed is greatly improved, the accuracy of an output voltage and the current of the load is improved, and at the same time, the system stability is enhanced and wide universality is achieved.

DETAILED DESCRIPTION OF EMBODIMENTS

The present invention provides a multi-channel dual-mode digital control LED driving circuit and an LED lamp, achieving dual-mode cooperation working by means of a digital control module and a constant current control module, improving an accuracy of an output voltage and a current of a load.

In order to make the purpose, technical solution and the advantages of the present invention clearer and more explicit, further detailed descriptions of the present invention are stated here, referencing to the attached drawings and some preferred embodiments of the present invention. It should be understood that the detailed embodiments of the invention described here are used to explain the present invention only, instead of limiting the present invention.

Figure 1:
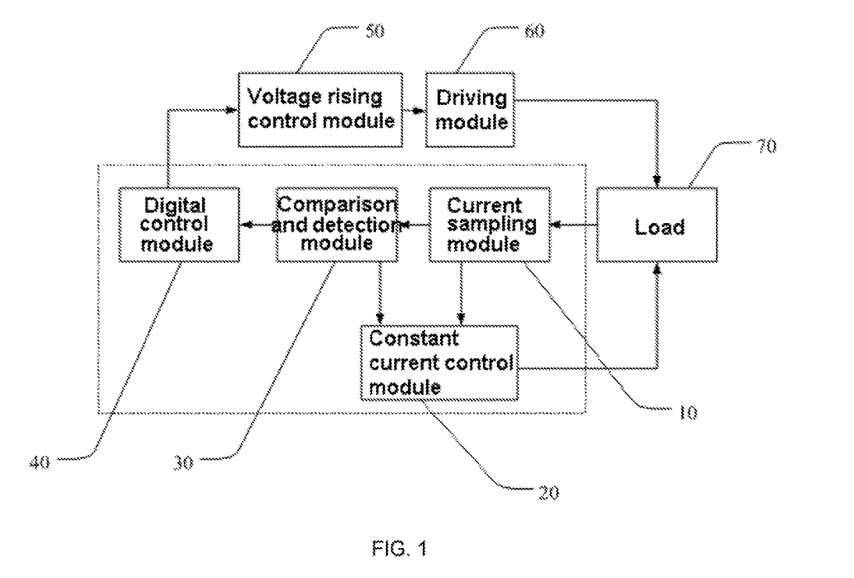
FIG. 1 illustrates a block diagram of a multi-channel dual-mode digital control LED driving circuit provided by the present invention.

Referencing to FIG. 1, the multi-channel dual-mode digital control LED driving circuit provided by the present invention, comprises: a current sampling module 10, a comparison and detection module 30, a digital control module 40 and a constant current control module 20.

The current sampling module 10 converts a current signal of a load 70 into a sampling voltage signal, before outputting to the comparison and detection module 30 and the constant current control module 20; the comparison and detection module 30 compares the sampling voltage to a fixed voltage, before generating a high/low voltage signal according to a comparison result, and outputting to the digital control module 40, while at a same time, a dynamically changing voltage signal is generated and output to the constant current control module 20; the digital control module 40 outputs a corresponding step-up or step-down output signal to an external voltage boost control module 50 and a drive module 60 sequentially, according to the high/low voltage signal output from the comparison and detection module 30, thus a feedback and adjustment to the load is achieved; the constant current control module 20 compares to a fixed frequency sawtooth signal according to the sampling voltage, and generates a switching signal with a changing duty cycle in a real time, before controlling a switch state of an inner constant current drive tube according to the duty cycle change of the switching signal, so as to feed back and adjust the current of the load in a real time.

The external voltage boost control module 50 is applied to controlling a signal output from the digital control module 40 to raise a voltage, and controlling the drive module 60 to drive and adjust the load 70.

It can be seen that, the multi-channel dual-mode digital control LED driving circuit provided in the present invention, by means of feeding back an adjustment voltage for a load by the digital control module, and feeding back an adjustment current for the load in real time by the constant current control module, the driving circuit adjusts the load in real time, so that dual-mode cooperation working is realized, and thus a response speed is greatly improved, the accuracy of an output voltage and the current of the load is improved, and at the same time, the system stability is enhanced and wide universality is achieved.

Figure 2:
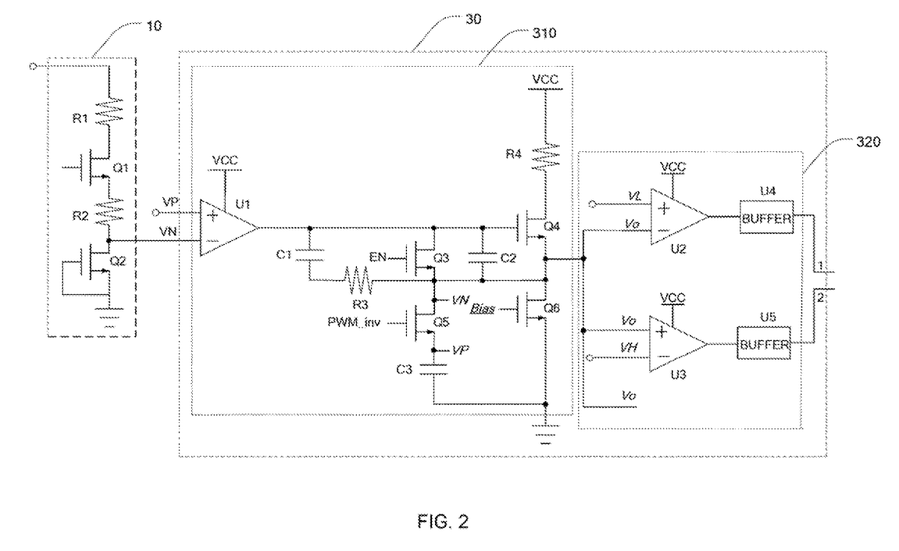
FIG. 2 illustrates a circuit diagram of a current sampling module and a comparison and detection module in a multi-channel dual-mode digital control LED driving circuit provided by the present invention.

Further, referencing to FIG. 2, the current sampling module 10 comprises a first resistor R1, a second resistor R2, a first MOS tube Q1 and a second MOS tube Q2; one end of the first resistor R1 connects to the load 70, another end of the first resistor R1 connects to a drain electrode of the first MOS tube Q1, a source electrode of the first MOS tube Q1 connects to a drain electrode of the second MOS tube Q2 through a second resistor R2, the drain electrode of the second MOS tube Q2 is an output end of the current sampling module 10, and outputs a sampling voltage VN, a gate electrode and a source electrode of the second MOS tube Q2 gets grounded. A gate electrode of the first MOS tube Q01 connects to a terminal providing a PWM signal, and receives the PWM signal, when a light adjustment is not needed, the gate electrode of the first MOS tube Q1 receives a high voltage signal and makes the first MOS tube Q1 in a connection state.

The current sampling module 10 is a balanced sampling structure, which may save an area of a PCB effectively. The second resistor R2 and the first resistor R1 are a structure with a big ratio, whose ratio is decided by an external sampling current, usually, the external current is at an order of mA to hundreds of mA, and the current of the first resistor R1 and the second resistor R2 is usually at an order of μA, thus, a resistance ratio between the second resistor R2 and the first resistor R1 is between several K:1 to a plurality of hundreds of K:1, preferably, the ratio is 10000:1. That is, the resistance of the second resistor R2 is much larger than that of the first resistor R1, in such a way, it may lower a disturbance to the sampling signal. The first MOS tube Q1 is a PWM signal switch tube, and the LED driving system may add a PWM light adjust function as required, a PWM signal is input from the gate electrode of the first MOS tube Q1, if the signal of the gate electrode of the first MOS tube Q1 is set a high voltage, that means, the PWM light adjust function is cancelled, or, it may adjust the light of the LED through the first MOS tube Q1.

The comparison and detection module 30 includes a detection unit 310 and a comparison unit 320.

The detection unit 310, applied to comparing and amplifying the sampling voltage VN with the fixed voltage VP, before outputting an amplifying signal to the comparison unit 320, the larger a ratio between the fixed voltage VP and the sampling voltage VN is, the higher a voltage of the output amplifying signal is. The multi-channel dual-mode digital control LED driving circuit provided by the present invention may achieve a function of mimicking the light adjustment, that is, through adjusting the fixed voltage VP, a range of the load current may be controlled, therefore, mimicking the light adjustment may be achieved.

The comparison unit 320 is applied to outputting a low voltage from a first output end and a high voltage from a second output end, when the amplifying signal Vo output from the detection unit 310 is larger than a first threshold voltage VL, and outputting a high voltage from the first output end and a low voltage from the second output end, when the amplifying signal Vo output from the detection unit 310 is smaller than a second threshold voltage VH, as well as outputting a low voltage from both the first and second output ends, when the amplifying signal Vo output from the detection unit 310 is larger than the second threshold voltage VL but smaller than the first threshold voltage VL.

An input end of the detection unit 310 connects to the output end of the current sampling module 10, the detection unit 310 connects to the comparison unit 320, while the first output end 1 and the second output end 2 of the comparison unit 320 connect to the digital control module 40.

Specifically, the detection unit 310 comprises a first operational amplifier U1, a first capacitor C1, a second capacitor C2, a third capacitor C3, a third resistor R3, a fourth resistor R4, a third MOS tube Q3, a fourth MOS tube Q4, a fifth MOS tube Q5 and a sixth MOS tube Q6; an inverting input end of the first operational amplifier U1 is the input end of the detection unit 310, and connects to the drain electrode of the second MOS tube Q2, a non-inverting input end of the first operational amplifier U1 connects to a fixed voltage supplier end, an output end of the first operational amplifier U1 connects to one end of the first capacitor C1, a drain electrode of the third MOS tube Q3, one end of the second capacitor C2 and a gate electrode of the fourth MOS tube Q4, another end of the first capacitor C1 connects to a source electrode of the third MOS tube Q3, a drain electrode of the fifth MOS tube Q5, another end of the second capacitor C2, a source electrode of the fourth MOS tube Q4 and a drain electrode of the sixth MOS tube Q6 through the third resistor R3, a gate electrode of the third MOS tube Q3 connects to an enable signal EN, a drain electrode of the fifth MOS tube further connects to the inverse input end of the first operational amplifier U1, a source electrode of the fifth MOS tube Q5 connects to the non-inverse input end of the first operational amplifier U1, and further gets grounded through the third capacitor C3, a gate electrode of the fifth MOS tube Q5 connects to a PWM inverse signal supplier end; a drain electrode of the fourth MOS tube Q4 connects to an external power supplier end VCC through a fourth resistor R4, a source electrode of the fourth MOS tube Q4 is the output end of the detection unit 310, and connects to the input end of the comparison unit 320 and the constant current control module 20; a source electrode of the sixth MOS tube Q6 gets grounded. The third MOS tube Q3, fourth MOS tube Q4, fifth MOS tube Q5, sixth MOS tube Q6 are NMOS tube.

The fixed voltage VP is set by the LED driving system, when a light adjustment is not needed, it may be supplied by a low-dropout linear regulator in the system, and, when the light adjustment is needed, only changing a value of the fixed voltage VP is required. The first operational amplifier U1, the fourth resistor R4, the fourth MOS tube Q4 and the sixth MOS tube Q6 compose a two-stage operational amplifier structure. The first operational amplifier U1 serves as a first stage of the two-stage operational amplifier; the fourth resistor R4, the fourth MOS tube Q4 and the sixth MOS tube Q6 serve as a second stage of the two-stage operational amplifier. The first capacitor C1, the second capacitor C2 and the third resistor R3 are all making a Miller compensation of the two-stage operational amplifier, an advantage of adding the compensation is making a feature of the operational amplifier at a high frequency more stable. An input signal to the gate electrode of the fifth MOS tube Q5 is an inverse signal of the PWM signal, PWM_inv, the drain electrode and source electrode of the fifth MOS tube Q5 connect to the non-inverse input end and the inverse input end of the first operational amplifier U1 respectively, since the circuit has reserved the PWM light adjusting function, thus, a function stated here is, when a signal of PWM light adjusting is off, the fifth MOS tube Q5 is conducted, and that pushes the fixed voltage VP closer to the sampling voltage VN, to prevent a PWM signal fast switch from bringing a signal disturbance to the output signal. The output of the two-stage operational amplifier is the fourth MOS tube Q4, while the second stage is a source follower structure, thus, the output signal Vo is a voltage signal, whose value is decided by that of the fixed voltage VP/sampling voltage VN.

The comparison unit 320 comprises a first comparator U2, a second comparator U3, a first buffer U4 and a second buffer U5; a non-inverting input end of the first comparator U2 connects to a first threshold voltage supplier end, an inverse input end of the first comparator U2 and a non-inverting input end of the second comparator U3 connect to the source electrode of the fourth MOS tube Q4, an inverse input end of the second comparator U3 connects to a second threshold voltage supplier end; an output end of the first comparator U2 connects to an input end of the first buffer U4, an output end of the first buffer U4 is the first output end 1 of the comparison unit 320, and connects to the digital control module 40, an output end of the second comparator U3 connects to an input end of the second buffer U5, an output end of the second buffer U5 is the second output end 2 of the comparison unit 320, and connects to the digital control module 40.

The signals after being compared by the first comparator U2 and the second comparator U3 generate the high and low voltage signals after being individually first-grade buffered and logically synthesized, before being output to the digital control module 40. Since the output signal Vo of the detection unit 310 is a voltage signal, thus, setting the second threshold voltage VH and the first threshold voltage VL as a high and low window threshold voltage (VH>VL), when the fixed voltage VP>the sampling voltage VN, the output voltage Vo>the second threshold voltage VH, thus, the first output end 1 of the comparison unit 320 outputs the low voltage, and the second output end 2 outputs the high voltage. When the fixed voltage VP<the sampling voltage VN, the output voltage Vo<the first threshold voltage VL, thus, the first output end 1 of the comparison unit 320 outputs the high voltage, and the second output end 2 outputs the low voltage. If the VP is close to or equal to the VN, according to a common-mode analysis, VL<Vo<VH, thus the first output end 1 and the second output end 2 of the comparison unit 320 both output the low voltage. It can be seen that, the output signals of both the first output end 1 and the second output end 2 of the comparison unit 320 may act as a control source signal of the digital control module 40 simultaneously. A relationship between the signal output from the first output end 1 and the second output end 2 of the comparison unit 320 and the VP/VN may be summarized as a following table:

| Relationship between VP and VN | The first output end 1 | The second output end 2 |
|---|---|---|
| VP > VN | 0 | 1 |
| VP < VN | 1 | 0 |
| VP = VN | 0 | 0 |

Figure 3:
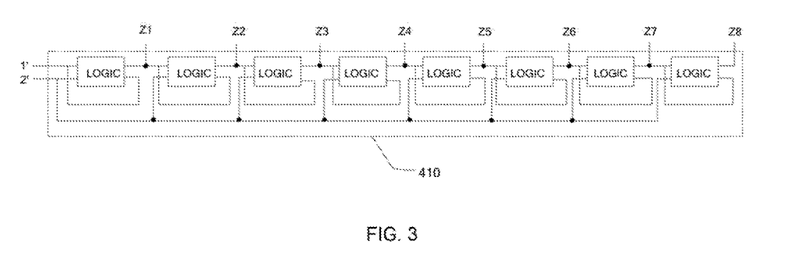
FIG. 3 illustrates a circuit diagram of a logic unit in a multi-channel dual-mode digital control LED driving circuit provided by the present invention.
Figure 4:
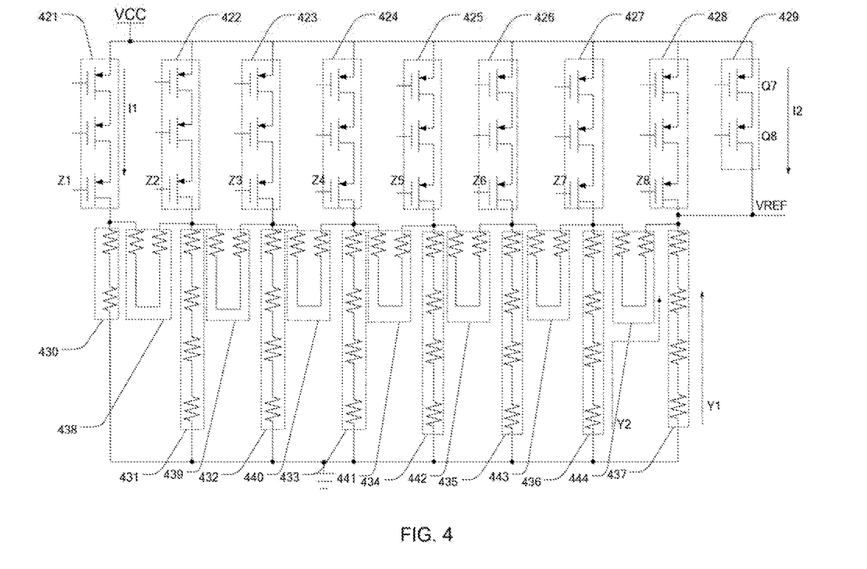
FIG. 4 illustrates a circuit diagram of a voltage control unit in a multi-channel dual-mode digital control LED driving circuit provided by the present invention.

The digital control module 40 comprises:

a logic unit 410, applied to converting the signals from both output ends of the comparison unit 320 into an eight-bit logic control signal, when the first output end 1 of the comparison unit 320 is outputting the low voltage, and the second output end 2 is outputting the high voltage, the eight-bit logic control signal rises bit by bit from low to high in a 256-bit interval; when the first output end 1 of the comparison unit 320 is outputting the high voltage, and the second output end 2 is outputting the low voltage, the eight-bit logic control signal reduces bit by bit from high to low in the 256-bit interval; when the first output end 1 and the second output end 2 of the comparison unit 320 are both outputting the low voltage, the eight-bit logic control signal keeps unchanged. The logic unit 410 comprises eight output ends, whose eight output signals are Z1~Z8, each output end outputs a high voltage or a low voltage, that is, signals Z1~Z8 output from eight output ends of the logic unit 410 have composed the eight-bit logic control signal. The eight-bit logic control signal is represented by a binary number, and may form 256 different binary numbers. The logic unit 410 composes eight logic subunits LOGIC, whose action is logically synthesizing the signals input from both input ends of the logic unit 410, into the according eight-bit logic control signal, whose inner structure is composed by a plurality of digital units including a D Flip-Flop, a RS Latch and more;

a voltage control unit, applied to stepping down the output voltage a stepped voltage Vstep, when the eight-bit logic control signal is raised one bit, and stepping up the output voltage a stepped voltage Vstep, when the eight-bit logic control signal is lowered one bit.

A first input end 1' of the logic unit 410 connects to the first output end 1 of the comparison unit 320, a second input end 2' of the logic unit 410 connects to the second output end 2 of the comparison unit 320, the logic unit 410 connects to the external voltage boost control module through the voltage control unit.

It can be seen that, according to the signal output from the comparison unit 320, under a joint action of the logic unit 410 and the voltage control unit, the voltage of the load 70 may be adjusted, and the range for adjustment is divided into 256 sections, making the adjustment to the load 70 pretty accurate and stable.

Referencing to FIG. 4, the voltage control unit comprises eight current switch subunits controlled by the eight bit logic control signal, including: a first current switch subunit 421, a second current switch subunit 422, a third current switch subunit 423, a fourth current switch subunit 424, a fifth current switch subunit 425, a sixth current switch subunit 426, a seventh current switch subunit 427, an eighth current switch subunit 428, and a resistors array connected according to a binary rule, together with a mirror current subunit 429.

The resistors array comprises fifteen resistors arrays, that is, a first resistors string 430, a second resistors string 431, a third resistors string 432, a fourth resistors string 433, a fifth resistors string 434, a sixth resistors string 435, a seventh resistors string 436, an eighth resistors string 437, a ninth resistors string 438, a tenth resistors string 439, an eleventh resistors string 440, a twelfth resistors string 441, a thirteenth resistors string 442, a fourteenth resistors string 443 and a fifteenth resistors string 444;

the current switch subunits, applied to outputting a first mirror current I1 to the resistors arrays, according to a corresponding logic control signal in the eight-bit logic control signal.

the mirror current subunit 429, applied to outputting a second mirror current I2 to the resistors array.

An external power supplier end VCC connects to one end of the first resistors string 430 and one end of the ninth resistors string 438, through the first current switch subunit 421, while another end of the first resistors string 430 gets grounded; the external power supplier end VCC connects to another end of the ninth resistors string 438 and one end of the second resistors string 431 and one end of the tenth resistors string 439, through the second current switch subunit 422, while another end of the second resistors string 431 gets grounded; the external power supplier end VCC connects to another end of the tenth resistors string 439 and one end of the third resistors string 432 and one end of the eleventh resistors string 440, through the third current switch subunit 423, while another end of the third resistors string 432 gets grounded; the external power supplier end VCC connects to another end of the eleventh resistors string 440, one end of the fourth resistors string 433 and one end of the twelfth resistors string 441 through the fourth current switch subunit 424, while another end of the fourth resistors string 433 gets grounded; the external power supplier end VCC connects to another end of the twelfth resistors string 441, one end of the fifth resistors string 434 and one end of the thirteenth resistors string 442, through the fifth current switch subunit 425, while another end of the fifth resistors string 434 gets grounded; the external power supplier end VCC connects to another end of the thirteenth resistors string 442, one end of the sixth resistors string 435 and one end of the fourteenth resistors string 443, through the sixth current switch subunit 426, while another end of the sixth resistors string 435 gets grounded; the external power supplier end VCC connects to another end of the fourteenth resistors string 443, one end of the seventh resistors string 436 and one end of the fifteenth resistors string 444, through the seventh current switch subunit 427, while another end of the seventh resistors string 436 gets grounded; the external power supplier end VCC connects to another end of the fifteenth resistors string 444 and one end of the eighth resistors string 437, through the eighth current switch subunit 428 and the mirror current subunit 429, while another end of the eighth resistors string 437 gets grounded; one end of the eighth resistors string 437 is the output end of the voltage control unit, and connects to the external voltage boost control module 50.

Wherein, the first current switch subunit 421, second current switch subunit 422, third current switch subunit 423, fourth current switch subunit 424, fifth current switch subunit 425, sixth current switch subunit 426, seventh current switch subunit 427, eighth current switch subunit 428 are all a same, and corresponding to the first resistors string 430, the second resistors string 431, the third resistors string 432, the fourth resistors string 433, the fifth resistors string 434, the sixth resistors string 435, the seventh resistors string 436 and the eighth resistors string 437; each current switch subunit comprises two PMOS tubes and one switch tube; the two PMOS tubes own a deviated current source construction of a common-source and common-gate, the source electrode of one PMOS tube connects to the external power supplier end, a drain electrode connects to a source electrode of another PMOS tube, a drain electrode of another PMOS tube connects to a source electrode of the switch tube, a gate of the switch tube connects to the output end of the logic unit correspondingly, a drain electrode of the switch tube is the output end of the current switch subunit, and gets grounded through the corresponding resistors string. The gate electrodes of the switch tubes in the eight current switch subunits connect to the eight output ends of the logic unit 410 correspondingly, that is, the eight-bit logic control signal controls an on-off of the eight current switch subunits, so as to change the output voltage of the voltage control unit.

The mirror current subunit 429 comprises a seventh MOS tube Q7 and an eighth MOS tube Q8. The seventh MOS tube Q7 and the eighth MOS tube Q8 are PMOS tubes, and are in a state of always on.

All the resistors in the resistors array are the same, wherein, the first resistors string 430, the ninth resistors string 438, the tenth resistors string 439, the eleventh resistors string 440, the twelfth resistors string 441, the thirteenth resistors string 442, the fourteenth resistors string 443 and the fifteenth resistors string 444 comprise two resistors connected in series, while the second resistors string 431, the third resistors string 432, the fourth resistors string 433, the fifth resistors string 434, the sixth resistors string 435, the seventh resistors string 436 and the eighth resistors string 437 comprise four resistors connected in series.

The eight-bit logic control signal is generated by the logic unit 410, the output signals from the first output end 1 and the second output end 2 of the comparison unit 320 may control a state of the logic unit 410 in generating the eight-bit logic control signal, further control an output voltage VREF from the digital control module 40 to go up or down, while the whole process is reversible in real time.

The current switch subunit and the according resistors string compose a single channel, wherein, the two PMOS tubes of the current switch subunit own a deviated current source construction of a common-source and common-gate, whose main function is mirroring the external current into a present channel current I1, the switch tube may be decided by high or low of one bit in the according eight-bit logic control signal. The mirror current subunit 429 is a path always on, whose mirror current is I2, and its size may be set through setting a ratio of the width to length of the two PMOS tubes in the current switch subunits of the seventh MOS tube Q7/the eighth MOS tube Q8.

When the eight bits in the eight-bit logic control signal (Z1-Z8) are all in the high voltage, all paths are not conducted, except for the one of the mirror current subunit 429. Since the resistor is designed following a binary rule, thus the output voltage VREF of the digital control module 40 may be calculated by the mirror current I2 timing a total resistance of the resistors array. Take Y1 and Y2 branches controlled by the eighth current switch sub-unit 428 as an example, the voltage of the Y1 branch is $$\frac{I_2}{2^1} \times 4R,$$

the voltage of the Y2 branch is $$\frac{I_2}{2^2} \times 4R + \frac{I_2}{2^1} \times 2R,$$

wherein, $$\frac{I_2}{2^2} \times 4R$$

is the voltage value of the seventh resistors string, while $$\frac{I_2}{2^1} \times 2R$$

is the voltage value of the fifteenth resistors string. In a sample principle, the voltages of the branches controlled by the other seven current switch subunits may be achieved, that is, the output voltage of the digital control module 40 is $$VREF = \frac{I_2}{2^7} \times 4R + \frac{I_2}{2^6} \times 2R + \frac{I_2}{2^5} \times 2R + \ldots + \frac{I_2}{2^1} \times 2R.$$

Since the eight current switch subunits are all disconnected, and there is no the first mirror current I1, thus the currents of all resistors are provided by the second mirror current I2, while a minimum VREF is Vmin. When the eight-bit logic control signal (Z1-Z8) appears a signal with high and low voltages following the eight-bit binary rule, when a current switch subunit is on, that is, the first mirror current I1 is superimposing onto a corresponding channel following the according binary rule, the current of the resistor in the channel increases accordingly, the same as the VREF. Every time when one bit in the Z1-Z8 changes, the VREF steps forward one digit following the Vstep, the value of the Vstep is decided by an absolute value of the first mirror current I1 and the resistor R in the resistors array, the larger the absolute values of the first mirror current I1 and the resistor R in the resistors array is, the larger the Vstep is, on the contrary, the smaller it is, which may be sent following the specific applications. When all of the Z1-Z8 are on a low voltage, the eight current switch subunits are all conducted, the first mirror currents I1 of the eight channels are all superimposed, and now the maximum of the VREF is Vmax. A range of the VREF is decided by three factors including the first mirror current I1, the second mirror current I2 and the resistor R in the resistors array, which may be adjusted according to a requirement in a real application.

It may be seen from the above principle analysis that, the eight-bit logic control signal controls the superimposing of the first mirror current I1, so as to affect a variation of the VREF. The width to length ratio of each PMOS tube in the eight current switch subunits is designed equally, thus the first mirror current I1 of each channel is approaching to a uniform, while all resistors R are designed in an equal ratio, all PMOS tubes and resistors R are matched and placed strictly, in order to make a variation tendency of each channel a same, an advantage of the present technology is greatly lowering a effect brought by a plurality of factors including a process deviation, a temperature, a humidity, a stress and more.

The following table lists a result of the VREF changing according to the variations of the signals of Z1-Z8:

| Eight-bit logic control signal | Z1 | Z2 | Z3 | Z4 | Z5 | Z6 | Z7 | Z8 | VREF |
|---|---|---|---|---|---|---|---|---|---|
| 00000000 | low | low | low | low | low | low | low | low | Vmax |
| 00000001 | high | low | low | low | low | low | low | low | Vmax-Vstep |
| 00000010 | low | high | low | low | low | low | low | low | Vmax-2Vstep |
| ... | | | | | | | | | Vmax-nVstep |
| 11111111 | high | high | high | high | high | high | high | high | Vmin |

It may be seen that, a control method of the digital control module 40 is different to that of a conventional analog control method, owning a character of controlling the voltage precisely, a magnitude and range of the step voltage adjusted may be set freely (following the absolute values of the I1 and R), thus it may effectively improve a precision of the voltage for control, and reduce an output ripple. The present part of the control module adopts a method of the current switch controlling the resistors to divide the voltage, since each resistor matches the size of each channel current mirror tube strictly, thus it may reduce the impact of a plurality of factors in the production a lot, including the production process deviation, temperature, humidity and more.

Figure 5:
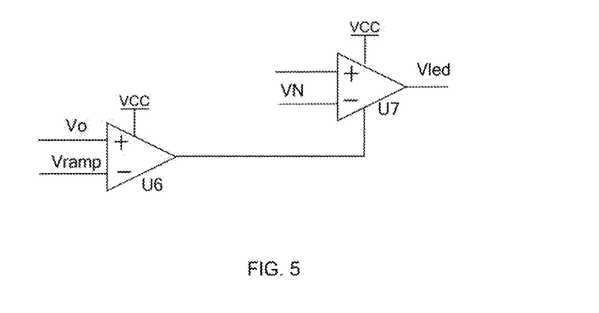
FIG. 5 illustrates a circuit diagram of a constant current control module in a multi-channel dual-mode digital control LED driving circuit provided by the present invention.

Please referencing to FIG. 5, the constant current control module 20 comprises a third comparator U6 and a second operational amplifier U7, a non-inverse input end of the third operational amplifier U6 connects to the output end of the detection unit 310, and an inverse input end of the third comparator U6 connects to an inherent low frequency sawtooth wave signal Vramp provider end, an output end of the third comparator U6 connects to a negative power end of the second operational amplifier U7, whose positive power end connects to the external power supplier end VCC; a non-inverse input end of the second operational amplifier U7 connects to a high voltage signal provider end (to input a plurality of voltages including 5V, 4V and else), while an inverse input end of the second operational amplifier connects to an output end of the sampling module 10, and an output end of the second operational amplifier connects to the load 70.

After the third comparator U6 comparing the sampling voltage Vo and the inherent low frequency sawtooth wave signal Vramp of the system, a square wave output signal with a duty cycle adjustable is generated, wherein, the duty cycle is decided by the voltage of Vo. The signal output by the third comparator U6 controls the second operational amplifier U7, whose work state is designed as a fully conducted state, that is, whose non-inverse input end inputs a high voltage signal (such as 5V, 4V and more), and whose inverse input end inputs a sampling voltage signal VN, wherein, the sampling voltage signal VN is usually far smaller than the high voltage signal, thus the signal Vled output from the output end of the second operational amplifier U7 is always at a high voltage state, the constant current control module 20 controls the output signal Vled through the square wave signal with the duty ratio adjustable generated by the third comparator U6, so as to control the duty ratio of the Vled, and realize a variation of an average value of the output current by changing the duty ratio, so as to achieve a purpose of controlling the current of the load.

The constant current control module 20 directly feeds back to the current of the load through comparing the sampling voltage signals to the sawtooth waves, to participate in an adjustment, which is essentially a feedforward loop of the system, the present operation mode is one of the dual modes, since it does not experience a feedback through a large-loop of the system, thus it may greatly improve a response speed of the system.

All above, the multi-channel dual-mode digital control LED driving circuit provided in the present invention, owns a plurality of following benefits:

1. The present invention adopts a dual-mode control, the feedback through the whole large-loop adopts a peak current mode to work, and the constant current control part of a small-loop adds a feedforward control to adjust the duty cycle of the load current in a real time, which adjusts a change of the load in real time, and greatly improves a responding speed;
2. The present invention realizes a regulation to the output voltage through an eight-bit digital control system, and improves the precision of the output voltage, reduces the ripple, the specific current control circuit may effectively reduce the influence of the process deviation, temperature and else, to the system;

3. The present invention preserves a plurality of adjustable functions, including a number of the channels, a PWM light adjustment function, adjusting the size of the step voltage by the digital adjustment, controlling the voltage size of part of the windows, and more, which may be set according to a demand in a real application, and it has enriched a flexibility in applications.

Figure 6:
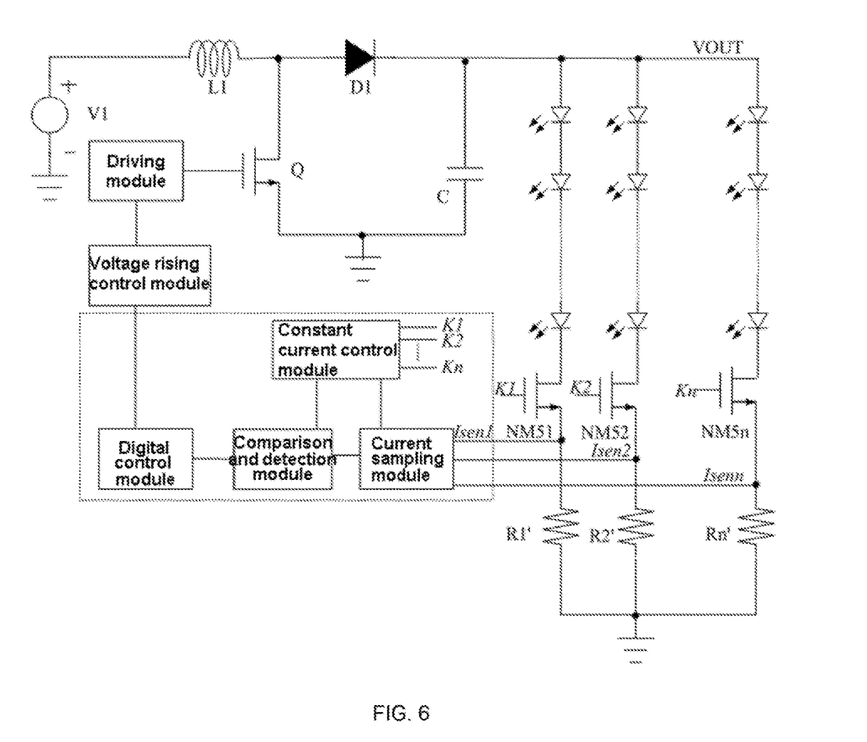
FIG. 6 illustrates a circuit diagram of an LED constant current driving system adopting a multi-channel dual-mode digital control LED driving circuit provided by the present invention.

FIG. 6 illustrates an LED constant current driving system adopting a multi-channel dual-mode digital control LED driving circuit provided by the present invention. A peripheral power drive tube Q, an electric inductor L1, a flyback diode D1 and a rechargeable capacitor C1 make up a classic boost structure, a load of the system is a number of n strings of LED light bars (a dashed line represents a plurality of neglected light emitting diodes), the NMOS tubes of NM51/NM52 . . . NM5n are the driving tubes for the n-string of LED light bars, R1'/R2' . . . Rn' are the corresponding n number of sampling resistors. The following description takes a channel with an NMOS tube NM51 as an example, to describe an operational process of the system: Isen1 is a sampling signal of the load current, for real-time sampling the load current, the signal is input to the current sampling module, the operation of the large-loop is as follows: the sampling signal outputs the digital control signal after passing through the comparison and detection module, the control signal decides the voltage boost or reduction of the digital control module, before passing through the external boost control module and drive module, and embodying the variations of the sampled current signals into the duty ratio variations of the square wave signals sent from the drive module to the drive tube, after passing through the classic voltage boost structure, the output voltage VOUT may be changed anytime, when Isen 1 has not reached a preset value, the VOUT keeps rising, when the system stables, the VOUT is in a dynamically balanced state. The operation of the small loop is as follows: the load current sampling signal is transmitted to the constant current control module, and compared with the inherent fixed frequency sawtooth wave signals, the variations of the current signals may cause the variations of the output duty ratio, the modulated signal is further fed back to the gate electrode K1/K2 . . . Zn of the drive tube, acting as a feed-forward role, and improves a response speed of the system.

In the whole embodiment, the part surrounded by a dotted-line frame, is a multi-channel dual-mode digital control LED driving circuit proved by the present invention, the peripheral circuit may add or reduce the number of the channels according to a real application. Additionally, to a plurality of indexes including the PWM light adjustment, the analog light adjustment, the adjustment precision of the digital control module, and more, may also be added or reduced according to requirements, thus the application range is relatively wide.

The multi-channel dual-mode digital control LED driving circuit provided in the present invention is further applicable to any electronic system and constant current driving system driven by LED.

According to the multi-channel dual-mode digital control LED driving circuit provided in the above said embodiment, the present invention further provides a LED lamp, which includes the above said multi-channel dual-mode digital control LED driving circuit. Due to the operation principle and technical feathers have been described in details in the above said embodiment, thus the descriptions thereof are omitted herein.

It should be understood that, the application of the present invention is not limited to the above examples listed. Ordinary technical personnel in this field can improve or change the applications according to the above descriptions, all of these improvements and transforms should belong to the scope of protection in the appended claims of the present invention.

What is claimed is:

1. A multi-channel dual-mode digital control light emitting diode (LED) driving circuit comprising: a current sampling module, a comparison and detection module, a digital control module and a constant current control module;

the current sampling module converts a current signal of a load into a sampling voltage signal, before outputting to the comparison and detection module and the constant current control module; the comparison and detection module compares the sampling voltage to a fixed voltage, before generating a high/low voltage signal according to a comparison result, and outputting to the digital control module, while at a same time, a dynamically changing voltage signal is generated and output to the constant current control module; the digital control module outputs a corresponding step-up or step-down output signal to an external voltage boost control module and a drive module sequentially, according to the high/low voltage signal output from the comparison and detection module, thus a feedback adjustment to the load is achieved; the constant current control module compares to a fixed frequency sawtooth signal according to the sampling voltage, and generates a switching signal with a changing duty cycle in a real time, before controlling a switch state of an inner constant current drive tube according to the duty cycle change of the switching signal, followed by feeding back an adjustment current for the load in a real time.

2. The multi-channel dual-mode digital control LED driving circuit according to claim 1, wherein, the comparison and detection module comprises:

a detection unit, applied to comparing and amplifying the sampling voltage with the fixed voltage, before outputting an amplifying signal to a comparison unit, the larger a ratio between the fixed voltage and the sampling voltage is, the higher a voltage of the output amplifying signal is;

a comparison unit, applied to outputting a low voltage from a first output end and a high voltage from a second output end, when the amplifying signal output from the detection unit is larger than a first threshold voltage, and outputting a high voltage from the first output end and a low voltage from the second output end, when the amplifying signal output from the detection unit is smaller than a second threshold voltage, as well as outputting a low voltage from both the first and second output ends, when the amplifying signal output from the detection unit is larger than the second threshold voltage but smaller than the first threshold voltage;

an input end of the detection unit connects to the output end of the current sampling module, the detection unit connects to the comparison unit, while the first and second output ends of the comparison unit connect to the digital control module.

3. The multi-channel dual-mode digital control LED driving circuit according to claim 2, wherein, the digital control module comprises:

a logic unit, applied to converting the signals from both output ends of the comparison unit into an eight-bit logic control signal, when the first output end of the comparison unit is outputting the low voltage, and the second output end is outputting the high voltage, the eight-bit logic control signal rises bit by bit from low to high in a 256-bit interval; when the first output end of the comparison unit is outputting the high voltage, and the second output end is outputting the low voltage, the eight-bit logic control signal reduces bit by bit from high to low in the 256-bit interval; when the first output end and the second output end of the comparison unit are both outputting the low voltage, the eight-bit logic control signal keeps unchanged;

a voltage control unit, applied to stepping down the output voltage a stepped voltage, when the eight-bit logic control signal is raised one bit, and stepping up the output voltage a stepped voltage, when the eight-bit logic control signal is lowered one bit;

a first input end of the logic unit connects to the first output end of the comparison unit, a second input end of the logic unit connects to the second output end of the comparison unit, the logic unit connects to the external voltage boost control module through the voltage control unit.

4. The multi-channel dual-mode digital control LED driving circuit according to claim 3, wherein, the voltage control unit comprises eight current switch subunits controlled by the eight bit logic control signal, including: a first current switch subunit, a second current switch subunit, a third current switch subunit, a fourth current switch subunit, a fifth current switch subunit, a sixth current switch subunit, a seventh current switch subunit, an eighth current switch subunit, and a resistors array connected according to a binary rule, together with a mirror current subunit;

the resistors array comprises fifteen resistors strings, including: a first resistors string, a second resistors string, a third resistors string, a fourth resistors string, a fifth resistors string, a sixth resistors string, a seventh resistors string, an eighth resistors string, a ninth resistors string, a tenth resistors string, an eleventh resistors string, a twelfth resistors string, a thirteenth resistors string, a fourteenth resistors string and a fifteenth resistors string;

the current switch subunits, applied to outputting a first mirror current to the resistors array, according to a corresponding logic control signal in the eight-bit logic control signal;

the mirror current subunit, applied to outputting a second mirror current to the resistors array;

an external power supplier end connects to one end of the first resistors string and one end of the ninth resistors string, through the first current switch subunit, while another end of the first resistors string gets grounded; the external power supplier end connects to another end of the ninth resistors string, one end of the second resistors string and one end of the tenth resistors string, through the second current switch subunit, while another end of the second resistors string gets grounded; the external power supplier end connects to another end of the tenth resistors string, one end of the third resistors string and one end of the eleventh resistors string, through the third current switch subunit, while another end of the third resistors string gets grounded; the external power supplier end connects to another end of the eleventh resistors string, one end of the fourth resistors string and one end of the twelfth resistors string through the fourth current switch subunit, while another end of the fourth resistors string gets grounded; the external power supplier end connects to another end of the twelfth resistors string, one end of the fifth resistors string and one end of the thirteenth resistors string, through the fifth current switch subunit, while another end of the fifth resistors string gets grounded; the external power supplier end connects to another end of the thirteenth resistors string, one end of the sixth resistors string and one end of the fourteenth resistors string, through the sixth current switch subunit, while another end of the sixth resistors string gets grounded; the external power supplier end connects to another end of the fourteenth resistors string, one end of the seventh resistors string and one end of the fifteenth resistors string, through the seventh current switch subunit, while another end of the seventh resistors string gets grounded; the external power supplier end connects to another end of the fifteenth resistors string and one end of the eighth resistors string, through the eighth current switch subunit and the mirror current subunit, while another end of the eighth resistors string gets grounded; one end of the eighth resistors string is the output end of the voltage control unit, and connects to the external voltage boost control module.

5. The multi-channel dual-mode digital control LED driving circuit according to claim 4, wherein, the current sampling module comprises a first resistor, a second resistor, a first MOS tube and a second MOS tube; one end of the first resistor connects to the load, another end of the first resistor connects to a drain electrode of the first MOS tube, a source electrode of the first MOS tube connects to a drain electrode of the second MOS tube through the second resistor, the drain electrode of the second MOS tube is an output end of the current sampling module, a gate electrode and a source electrode of the second MOS tube get grounded.

6. The multi-channel dual-mode digital control LED driving circuit according to claim 5, wherein, the detection unit comprises a first operational amplifier, a first capacitor, a second capacitor, a third capacitor, a third resistor, a fourth resistor, a third MOS tube, a fourth MOS tube, a fifth MOS tube and a sixth MOS tube; an inverting input end of the first operational amplifier is the input end of the detection unit, and connects to the drain electrode of the second MOS tube, a non-inverting input end of the first operational amplifier connects to a fixed voltage provider end, an output end of the first operational amplifier connects to one end of the first capacitor, a drain electrode of the third MOS tube, one end of the second capacitor and a gate electrode of the fourth MOS tube, another end of the first capacitor connects to a source electrode of the third MOS tube, a drain electrode of the fifth MOS tube, another end of the second capacitor, a source electrode of the fourth MOS tube and a drain electrode of the sixth MOS tube through the third resistor, a gate electrode of the third MOS tube connects to an enable signal, a drain electrode of the fifth MOS tube further connects to the inverse input end of the first operational amplifier, a source electrode of the fifth MOS tube connects to the non-inverse input end of the first operational amplifier, and further gets grounded through the third capacitor, a gate electrode of the fifth MOS tube connects to a PWM inverse signal provider end; a drain electrode of the fourth MOS tube connects to an external power supplier end through a fourth resistor, a source electrode of the fourth MOS tube is the output end of the detection unit, and connects to the input end of the comparison unit and the constant current control module; a source electrode of the sixth MOS tube gets grounded.

7. The multi-channel dual-mode digital control LED driving circuit according to claim 6, wherein, the comparison unit comprises a first comparator, a second comparator, a first buffer and a second buffer; a non-inverting input end of the first comparator connects to a first threshold voltage provider end, an inverse input end of the first comparator and a non-inverting input end of the second comparator connect to the source electrode of the fourth MOS tube, an inverse input end of the second comparator connects to a second threshold voltage provider end; an output end of the first comparator connects to an input end of the first buffer, an output end of the first buffer is the first output end of the comparison unit, and connects to the digital control module, an output end of the second comparator connects to an input end of the second buffer, an output end of the second buffer is the second output end of the comparison unit.

8. The multi-channel dual-mode digital control LED driving circuit according to claim 7, wherein, the first current switch subunit, second current switch subunit, third current switch subunit, fourth current switch subunit, fifth current switch subunit, sixth current switch subunit, seventh current switch subunit, eighth current switch subunit are all a same; each current switch subunit comprises two PMOS tubes and one switch tube; the two PMOS tubes own a deviated current source construction of a common-source and common-gate: the source electrode of one PMOS tube connects to the external power supplier end, a drain electrode connects to a source electrode of another PMOS tube, a drain electrode of another PMOS tube connects to a source electrode of the switch tube, a gate electrode of the switch tube connects to the output end of the logic unit correspondingly, a drain electrode of the switch tube is the output end of the current switch subunit, and gets grounded through the corresponding resistors string.

9. The multi-channel dual-mode digital control LED driving circuit according to claim 8, wherein, the constant current control module comprises a third comparator and a second operational amplifier, a non-inverse input end of the third operational amplifier connects to the output end of the detection unit, and an inverse input end of the third comparator connects to an inherent low frequency sawtooth wave signal provider end, an output end of the third comparator connects to a negative power end of the second operational amplifier, whose positive power end connects to the external power supplier end VCC; a non-inverse input end of the second operational amplifier connects to a high voltage signal provider end, while an inverse input end of the second operational amplifier connects to an output end of the sampling module, and an output end of the second operational amplifier connects to the load.

10. An LED lamp system comprising: a current sampling module, a comparison and detection module, a digital control module and a constant current control module;

the current sampling module converts a current signal of a load into a sampling voltage signal, before outputting to the comparison and detection module and the constant current control module; the comparison and detection module compares the sampling voltage to a fixed voltage, before generating a high/low voltage signal according to a comparison result, and outputting to the digital control module, while at a same time, a dynamically changing voltage signal is generated and output to the constant current control module; the digital control module outputs an according stepping up or down output signal to an external voltage boost control module and a drive module sequentially, according to the high/low voltage signal output from the comparison and detection module, thus a feedback adjustment to the load is achieved; the constant current control module compares to a fixed frequency sawtooth signal according to the sampling voltage, and generates a switching signal with a changing duty cycle in a real time, before controlling a switch state of an inner constant current drive tube according to the duty cycle change of the switching signal, followed by feeding back an adjustment current for the load in a real time.

11. The LED lamp system according to claim 10, wherein, the comparison and detection module comprises:

a detection unit, applied to comparing and amplifying the sampling voltage with the fixed voltage, before outputting an amplifying signal to a comparison unit, the larger a ratio between the fixed voltage and the sampling voltage is, the higher a voltage of the output amplifying signal is;

a comparison unit, applied to outputting a low voltage from a first output end and a high voltage from a second output end, when the amplifying signal output from the detection unit is larger than a first threshold voltage, and outputting a high voltage from the first output end and a low voltage from the second output end, when the amplifying signal output from the detection unit is smaller than a second threshold voltage, as well as outputting a low voltage from both the first and second output ends, when the amplifying signal output from the detection unit is larger than the second threshold voltage but smaller than the first threshold voltage;

an input end of the detection unit connects to the output end of the current sampling module, the detection unit connects to the comparison unit, while the first and second output ends of the comparison unit connect to the digital control module.

12. The LED lamp system according to claim 11, wherein, the digital control module comprises:

a logic unit, applied to converting the signals from both output ends of the comparison unit into an eight-bit logic control signal, when the first output end of the comparison unit is outputting the low voltage, and the second output end is outputting the high voltage, the eight-bit logic control signal rises bit by bit from low to high in a 256-bit interval; when the first output end of the comparison unit is outputting the high voltage, and the second output end is outputting the low voltage, the eight-bit logic control signal reduces bit by bit from high to low in the 256-bit interval; when the first output end and the second output end of the comparison unit are both outputting the low voltage, the eight-bit logic control signal keeps unchanged;

a voltage control unit, applied to stepping down the output voltage a stepped voltage, when the eight-bit logic control signal is raised one bit, and stepping up the output voltage a stepped voltage, when the eight-bit logic control signal is lowered one bit;

a first input end of the logic unit connects to the first output end of the comparison unit, a second input end of the logic unit connects to the second output end of the comparison unit, the logic unit connects to the external voltage boost control module through the voltage control unit.

13. The LED lamp system according to claim 12, wherein, the voltage control unit comprises eight current switch subunits controlled by the eight bit logic control signal, including: a first current switch subunit, a second current switch subunit, a third current switch subunit, a fourth current switch subunit, a fifth current switch subunit, a sixth current switch subunit, a seventh current switch subunit, an eighth current switch subunit, and a resistors array connected according to a binary rule, together with a mirror current subunit;

the resistors array comprises fifteen resistors strings, including: a first resistors string, a second resistors string, a third resistors string, a fourth resistors string, a fifth resistors string, a sixth resistors string, a seventh resistors string, an eighth resistors string, a ninth resistors string, a tenth resistors string, an eleventh resistors string, a twelfth resistors string, a thirteenth resistors string, a fourteenth resistors string and a fifteenth resistors string;

the current switch subunits, applied to outputting a first mirror current to the resistors arrays, according to a corresponding logic control signal in the eight-bit logic control signal;

the mirror current subunit, applied to outputting a second mirror current to the resistors array;

an external power supplier end connects to one end of the first resistors string and one end of the ninth resistors string, through the first current switch subunit, while another end of the first resistors string gets grounded; the external power supplier end connects to another end of the ninth resistors string, one end of the second resistors string and one end of the tenth resistors string, through the second current switch subunit, while another end of the second resistors string gets grounded; the external power supplier end connects to another end of the tenth resistors string, one end of the third resistors string and one end of the eleventh resistors string, through the third current switch subunit, while another end of the third resistors string gets grounded; the external power supplier end connects to another end of the eleventh resistors string, one end of the fourth resistors string and one end of the twelfth resistors string through the fourth current switch subunit, while another end of the fourth resistors string gets grounded; the external power supplier end connects to another end of the twelfth resistors string, one end of the fifth resistors string and one end of the thirteenth resistors string, through the fifth current switch subunit, while another end of the fifth resistors string gets grounded; the external power supplier end connects to another end of the thirteenth resistors string, one end of the sixth resistors string and one end of the fourteenth resistors string, through the sixth current switch subunit, while another end of the sixth resistors string gets grounded; the external power supplier end connects to another end of the fourteenth resistors string, one end of the seventh resistors string and one end of the fifteenth resistors string, through the seventh current switch subunit, while another end of the seventh resistors string gets grounded; the external power supplier end connects to another end of the fifteenth resistors string and one end of the eighth resistors string, through the eighth current switch subunit and the mirror current subunit, while another end of the eighth resistors string gets grounded; one end of the eighth resistors string is the output end of the voltage control unit, and connects to the external voltage boost control module.

14. The LED lamp system according to claim 13, wherein, the current sampling module comprises a first resistor, a second resistor, a first MOS tube and a second MOS tube; one end of the first resistor connects to the load, another end of the first resistor connects to a drain electrode of the first MOS tube, a source electrode of the first MOS tube connects to a drain electrode of the second MOS tube through the second resistor, the drain electrode of the second MOS tube is an output end of the current sampling module, a gate electrode and a source electrode of the second MOS tube get grounded.

15. The LED lamp system according to claim 14, wherein, the detection unit comprises a first operational amplifier, a first capacitor, a second capacitor, a third capacitor, a third resistor, a fourth resistor, a third MOS tube, a fourth MOS tube, a fifth MOS tube and a sixth MOS tube; an inverting input end of the first operational amplifier is the input end of the detection unit, and connects to the drain electrode of the second MOS tube, a non-inverting input end of the first operational amplifier connects to a fixed voltage provider end, an output end of the first operational amplifier connects to one end of the first capacitor, a drain electrode of the third MOS tube, one end of the second capacitor and a gate electrode of the fourth MOS tube, another end of the first capacitor connects to a source electrode of the third MOS tube, a drain electrode of the fifth MOS tube, another end of the second capacitor, a source electrode of the fourth MOS tube and a drain electrode of the sixth MOS tube through the third resistor, a gate electrode of the third MOS tube connects to an enable signal, a drain electrode of the fifth MOS tube further connects to the inverse input end of the first operational amplifier, a source electrode of the fifth MOS tube connects to the non-inverse input end of the first operational amplifier, and further gets grounded through the third capacitor, a gate electrode of the fifth MOS tube connects to a PWM inverse signal provider end; a drain electrode of the fourth MOS tube connects to an external power supplier end through a fourth resistor, a source electrode of the fourth MOS tube is the output end of the detection unit, and connects to the input end of the comparison unit and the constant current control module; a source electrode of the sixth MOS tube gets grounded.

16. The LED lamp system according to claim 15, wherein, the comparison unit comprises a first comparator, a second comparator, a first buffer and a second buffer; a non-inverting input end of the first comparator connects to a first threshold voltage provider end, an inverse input end of the first comparator and a non-inverting input end of the second comparator connect to the source electrode of the fourth MOS tube, an inverse input end of the second comparator connects to a second threshold voltage provider end; an output end of the first comparator connects to an input end of the first buffer, an output end of the first buffer is the first output end of the comparison unit, and connects to the digital control module, an output end of the second comparator connects to an input end of the second buffer, an output end of the second buffer is the second output end of the comparison unit.

17. The LED lamp system according to claim 16, wherein, the first current switch subunit, second current switch subunit, third current switch subunit, fourth current switch subunit, fifth current switch subunit, sixth current switch subunit, seventh current switch subunit, eighth current switch subunit are all a same; each current switch subunit comprises two PMOS tubes and one switch tube; the two PMOS tubes own a deviated current source construction of a common-source and common-gate: the source electrode of one PMOS tube connects to the external power supplier end, a drain electrode connects to a source electrode of another PMOS tube, a drain electrode of another PMOS tube connects to a source electrode of the switch tube, a gate electrode of the switch tube connects to the output end of the logic unit correspondingly, a drain electrode of the switch tube is the output end of the current switch subunit, and gets grounded through the corresponding resistors string.

18. The LED lamp system according to claim 17, wherein, the constant current control module comprises a third comparator and a second operational amplifier, a non-inverse input end of the third operational amplifier connects to the output end of the detection unit, and an inverse input end of the third comparator connects to an inherent low frequency sawtooth wave signal provider end, an output end of the third comparator connects to a negative power end of the second operational amplifier, whose positive power end connects to the external power supplier end VCC; a non-inverse input end of the second operational amplifier connects to a high voltage signal provider end, while an inverse input end of the second operational amplifier connects to an output end of the sampling module, and an output end of the second operational amplifier connects to the load.

\* \* \* \* \*